H. Y. SCARBOROUGH.
TANK FOR THE TREATMENT OF SEWAGE.
APPLICATION FILED AUG. 2, 1915. RENEWED SEPT. 27, 1916.
1,223,427.
Patented Apr. 24, 1917.
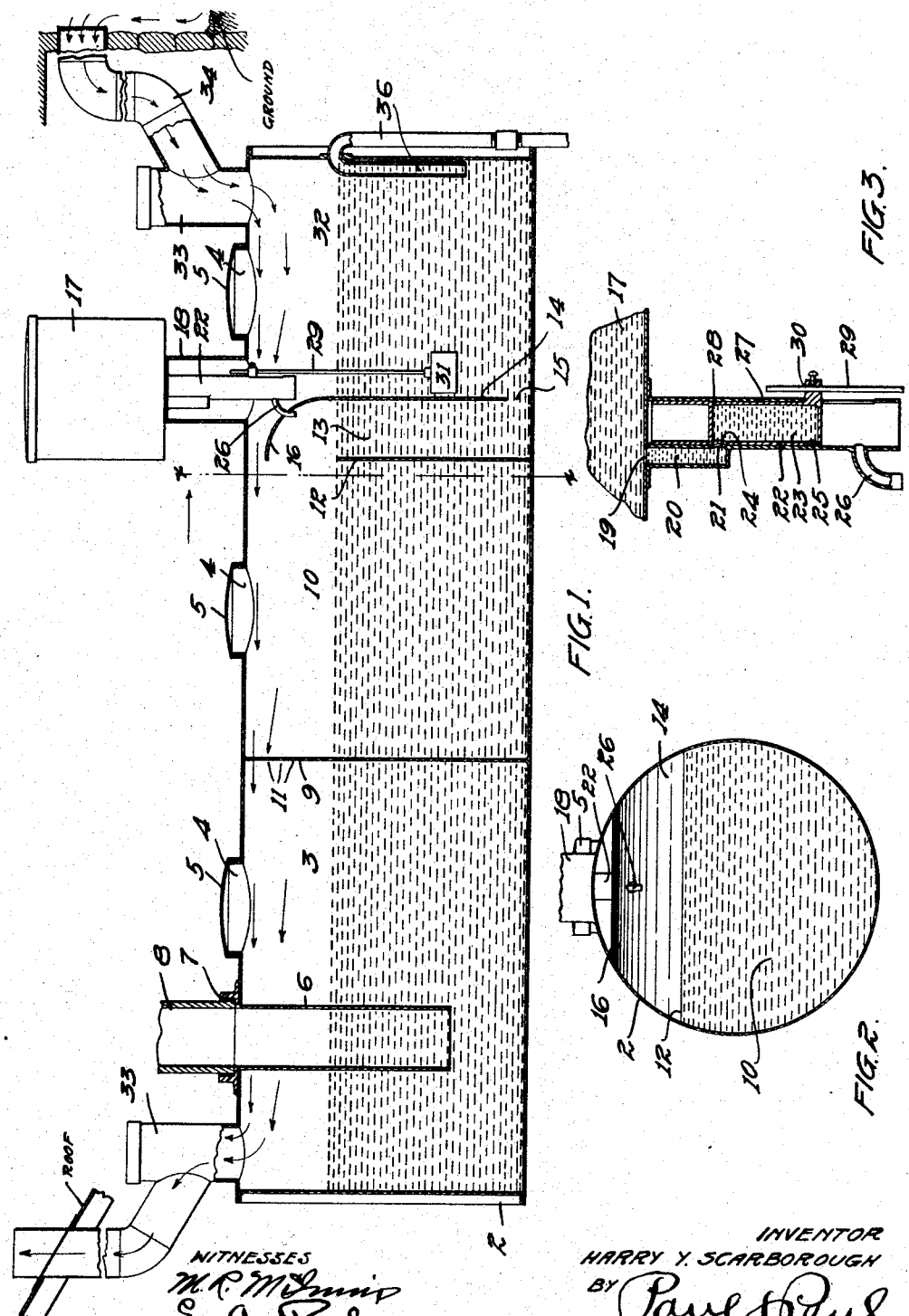
INVENTOR
HARRY Y. SCARBOROUGH
BY
ATTORNEYS

UNITED STATES PATENT OFFICE.

HARRY Y. SCARBOROUGH, OF MINNEAPOLIS, MINNESOTA.

TANK FOR THE TREATMENT OF SEWAGE.

1,223,427. Specification of Letters Patent. Patented Apr. 24, 1917.

Application filed August 2, 1915, Serial No. 43,268. Renewed September 27, 1916. Serial No. 122,546.

*To all whom it may concern:*

Be it known that I, HARRY Y. SCARBOROUGH, citizen of the United States, resident of Minneapolis, county of Hennepin, State of Minnesota, have invented certain new and useful Improvements in Tanks for the Treatment of Sewage, of which the following is a specification.

The object of my invention is to provide a tank for use in connection with a sanitary closet for reducing the sewage to a sterile liquid state, ready for discharge into some suitable place in the soil.

A further object is to provide a tank which will be absolutely sanitary and dispense entirely with the use of cesspools and hence adapted particularly for use in locations where there are no sewer connections.

A further object is to provide a sewage treating tank in which the treatment of the waste and its passage from one chamber to another and its final discharge will be entirely automatic and require no further attention when the apparatus is once installed.

A still further object is to provide means for the elimination of the waste by evaporation.

Other objects of the invention will appear from the following detailed description.

The invention consists generally in various constructions and combinations, all as hereinafter described and particularly pointed out in the claims.

In the accompanying drawings forming part of this specification,

Figure 1 is a longitudinal sectional view through a tank embodying my invention, Fig. 2 is a sectional view on the line $x$—$x$ of Fig. 1, Fig. 3 is a detail sectional view through the lower portion of the device, and from which the chemical sterilizing solution is delivered.

In the drawing, 2 represents a tank of suitable size and of suitable material, here shown composed of metal. At one end of this tank is a chamber 3 having a manhole opening 4 and a cover 5. A pipe 6 preferably depends into the chamber 3 and has a connection 7 with a pipe 8 which leads from the bowl of the closet (not shown). The pipe 6 preferably extends to a point near the bottom of the chamber and has an open lower end that is normally below the level of the material in the chamber. A partition 9 separates the chamber 3 from a chamber 10 and is provided with perforations 11 through which the liquid in the chamber 3 may pass to the chamber 10. This chamber 3 constitutes the initial receiving or bacterial action compartment of the tank and the waste from the bowl is discharged through the pipe 8 into this tank and by extending the pipe 6 to a point near the bottom of the tank, the rush of the liquid from the bowl may be utilized to agitate and stir up the solids which may have settled to the bottom of the chamber 3. The waste from the bowl will generally be deodorized by a suitable chemical in the bowl and passes to the chamber 3 in substantially the same condition as when in the bowl, and in this chamber 3 the solids are subjected to bacterial action and through fermentation are rapidly disintegrated, and the influx of the discharge from the bowl, amounting to some three gallons with each flushing of the bowl, will serve to agitate the contents of the chamber and stir it up to such an extent that bacterial action will affect the entire contents and thoroughly separate and reduce the solids to a liquid consistency, or to such a state that the contents of the chamber 3 will flow through the perforations 11 into the chamber 10.

The contents of the chamber 10, while being thoroughly disintegrated and reduced to a liquid form, will still remain fertile through the continuation of the bacterial action in the chamber 3. The chamber 10 has a partition 12 extending from the floor of the tank upwardly to a point near the top thereof and over this partition the liquid in the chamber 10 flows to a passage 13 that is formed by the partition 12 and a wall 14 that is spaced from the bottom of the tank to form a passage 15 leading from the chamber 13 and has a curved upper portion 16 which overhangs the upper end of the partition 12. This passage 13 is comparatively narrow and I prefer to deliver a sterilizing chemical thereto by the apparatus which I will now describe in detail.

17 is a tank, preferably supported by a wall 18 and having a discharge opening 19 in the bottom thereof. A passage 20 communicates with this discharge opening and has a port 21 in the lower wall thereof leading to a pipe 22 in which a plunger 23 is arranged. A port 24 is provided in the upper end of the plunger, communicating with the interior thereof, and a port 25 is provided in the lower portion of the plunger to communicate with a spout 26 when the plunger is moved to a point opposite the opening in said spout. The ports 27 and 28 provide a suitable vent for the chamber in the plunger. A rod 29 is secured to arm 30 which projects outwardly from the plunger through the slot 30' to the wall of the pipe. The rod 29 has a float 31 thereon depending within the chamber 32 at the opposite end of the tank 2 from the chamber 3 and communicating with the chamber 10 through the passages 15 and 13. The plunger descends slowly, with the float, as the liquid flows out of the chamber 32 until the port 25 is opposite the spout 26, when the chemical will begin to drip into the space 13 and will dribble slowly therein for a considerable length of time. The liquid in the space 13 will not, of course, drop below the level of the open end of the siphon and consequently, when the siphonic discharge ceases, there will be a considerable portion of the liquid in the bottom of the tank 32 and in the space 13, and the surface of the liquid in the space 13 will be strongly saturated with the chemical, ready to mix and thoroughly mingle with the fertile liquid as it flows over the partition 12 with the next flushing of a closet. As the chamber 10 overflows into the space 13, a portion of the sterilized liquid will pass down under the partition 14 into the main portion of the chamber 32, but not before it has mixed with the chemical and been thoroughly sterilized. The wall in the sterile chamber therefore acts as a retarding means to prevent the sterilizing chemical from spreading out in the sterile chamber and perhaps passing off with the siphonic discharge before the fertile liquid has been subjected thoroughly to its action. By providing the confined space and allowing the chemical to drip slowly therein, I am able to sterilize the fertile liquid as it passes over the partition before it passes under the dividing wall and enters the main portion of the sterile chamber. Each chamber 10 and 32 is preferably equipped with a manhole and cover corresponding to the one described with respect to Fig. 3.

A pipe 33 communicates with the top of the chamber 32 and from this pipe 33 a spout 34 leads to the open air, preferably near the ground line. At the other end of the tank is a similar pipe 33 and a spout 35 which extends to some suitable elevation, so that a circulation of air will be established through and across the tank and into the discharge pipe at the receiving end of the tank.

A considerable quantity of ammonia gas is generated in the bacterial action chamber and this gas, with evaporation from the chamber, mingles with the fresh air and passes off through the discharge pipe, thereby hastening the elimination of the waste material. The discharge pipe communicating with the bacterial chamber also has the function of relieving the air in the top of the tank when the bowl is flushed and its contents discharged into the tank.

The sterile tank has an automatic discharging means, such as the siphon 36, through which the sterile liquid is conducted to some suitable point outside the tank.

In the first compartment or chamber of my tank I promote and encourage bacterial action for the purpose of disintegrating the solids and reducing the same to a liquid condition by mingling with the chemical from the bowl, and during this fermentation the gases thrown off will be condensed and evaporated, passing to the open air through the discharge pipe and facilitating the process of elimination. As the contents of the bacterial chamber assumes a liquid form, it will flow through the perforations into the fertile chamber and there remain until an automatic discharge takes place in the sterile chamber. When the level of the liquid in the sterile chamber rises above the top or arch of the siphon by the flushing of a bowl, the discharge of liquid by siphonic action from this tank will begin and continue until the level of the liquid is below the open end of the siphon in the chamber or until the open end of the siphonic pipe is exposed. There may be several closet bowls connected with the tank and should a bowl be flushed during the siphonic discharge, a quantity of the fertile liquid, substantially three gallons, will flow over the partition 12 into the space 13, but will be prevented from mingling immediately with the sterile contents of the chamber 32 by the wall 14. This overflow from the chamber 10 may take place during the siphonic discharge of the chamber 32 or after it has ceased, and will continue from time to time until the chamber 32 is again filled and siphonic action reëstablished.

During the lowering of the level of the liquid in the chamber 32, the float 31 will drop and allow a quantity of the sterilizing chemical to be discharged into the space 13 where it will mingle with the incoming fertile liquid and thoroughly sterilize it before it passes under the wall 14 and enters the main portion of the sterile chamber. When the float has dropped a sufficient distance to allow the port in the chemical receptacle to register with the discharge spout, the flow of the chemical through said spout will begin and continue until the receptacle is empty. By varying the size of the receptacle and the area of the discharge port and spout, the length of time for the delivery of the chemical can be regulated. When the receptacle is empty, no further discharge of chemical will take place until the float is again raised by the liquid in the sterile chamber a sufficient distance to refill the receptacle 23 with chemical, ready for another discharge when siphonic action in the sterile tank again takes place. The chemical, however, that is delivered to the passage 13 will be retained to a considerable extent in this passage by the wall 14 to mingle with and sterilize each liquid overflow from the chamber 10 so that this liquid, as it descends and passes through the opening 15 into the main portion of the sterile tank, will be subjected to the action of the sterilizing solution before reaching the siphonic discharge pipe.

The volume of fertile liquid entering the passage 13 will depend, of course, upon how frequently the closet bowl is flushed. It may be delivered during the time of siphonic discharge of the sterile liquid or after such discharge, and the more frequently the bowl is flushed the sooner the tank 32 will fill and the sooner siphonic action will re-occur.

There will always be a quantity of sterile liquid in the chamber 32, the automatic discharge taking care of the overflow above a certain level in the tank, and as soon as siphonic action is set up, a certain amount of this sterile liquid will flow out automatically and at the same time the overflow of the fertile tank will enter the space between the partition 12 and the wall 14 and be sterilized. The action of the material in these tanks in the passage from one to another and the final discharge is all automatic, requiring no attention in the opening or closing of valves, it being merely necessary to keep a supply of sterilizing chemical in the receptacle 17; provision being made, first, for liquefying the solids by bacterial action, delivering the material when reduced to a liquid consistency to a second chamber or receptacle, and finally, allowing a quantity of the fertile liquid, proportional to the amount flushed from the bowl, to flow into a sterilizing chamber and therein made absolutely sterile before its automatic discharge from the tank.

The apparatus may be made in various sizes and the proportionate capacity of the chambers in the tank may be modified to suit different conditions, and in various ways the details of construction herein shown and described may be modified and still be within the scope of my invention.

An ordinary overflow may be substituted for the siphonic discharge, if preferred, and the device for delivering the sterilizing chemical to the sterile tank may be located at some other point and controlled through some other means than the float 31. These variations, however, will be obvious and relate to unessential details in the construction of the tank.

I claim as my invention:

1. An apparatus for the treatment of sewage comprising a tank having a chamber for disintegrating the solids, a chamber for the fertile liquid communicating with said disintegrating chamber, a sterile chamber having a discharge and receiving a supply of fertile liquid from said fertile chamber equal to the inflow to said disintegrating chamber with each flushing of the bowl, means for delivering a sterilizing chemical to said sterile chamber, and means retarding the mingling of the fertile liquid with the sterile liquid until subjected to the action of the sterilizing chemical.

2. An apparatus for the treatment of sewage comprising a tank having a chamber provided with means for communication with a closet bowl and in which chamber the solids are disintegrated by fermentation and bacterial action, a second chamber communicating with said fertile chamber to receive the waste in liquid form therefrom, a third chamber having a siphonic discharge and arranged to receive the fertile liquid from said second chamber with each overflow thereof, said third chamber having means for temporarily confining the fertile liquid and means for subjecting the fertile liquid while so confined to the action of a sterilizing chemical.

3. An apparatus for the treatment of sewage comprising a tank having an initial chamber provided with means for communication with a closet bowl and wherein the solids are disintegrated and liquefied, a second chamber having a perforated wall separating it from said first named chamber to receive the fertile liquid therefrom, a third or sterilizing chamber having a discharge and a partition separating it from said fertile chamber, means for delivering a sterilizing chemical to said sterile chamber and a wall mounted to retard the mingling of the overflow of the fertile liquid with the contents of said sterile chamber.

4. In a tank for treating sewage, a chamber adapted to contain liquid in fertile form, a sterilizing chamber, a partition separating said chambers, a wall spaced from said partition and from the floor of said tank and forming with said partition a narrow passage through which the fertile liquid flows to said sterilizing chamber, a receptacle for a sterilizing chemical having a spout for delivering the chemical to the space between said wall and said partition, and means controlled by the rise and fall of the sterile liquid in said sterilizing chamber for controlling the flow of said sterilizing chemical.

5. In a tank for treating sewage, a chamber adapted to contain liquid in fertile form, a sterilizing chamber, a partition separating said chambers, a wall spaced from said partition and from the floor of said tank and forming, with said partition, a narrow passage through which the fertile liquid flows to said sterilizing chamber, and means for delivering a sterilizing chemical to said narrow passage.

6. An apparatus for treating sewage comprising a tank having a chamber in which bacterial action takes place, a fertile chamber positioned to receive the liquefied waste from said bacterial action chamber, a sterilizing chamber communicating with said fertile chamber and having a discharge passage, means for temporarily confining the overflow from said fertile chamber and means for subjecting said overflow to the action of a sterilizing chemical while so confined.

7. An apparatus for the treatment of sewage comprising a tank having a bacterial action chamber provided with means for communication with a closet bowl, a chamber for the fertile liquid communicating with said bacterial action chamber, and a sterile chamber having a discharge and receiving a supply of fertile liquid from said fertile chamber equal to the inflow to said bacterial action chamber with each flushing of the bowl, means for temporarily confining the overflow of fertile liquid before delivery to said sterile chamber, and means for subjecting said overflow to the action of a sterilizing agent while so confined.

8. An apparatus for the treatment of sewage comprising a tank having partitions therein dividing it into a bacterial action chamber having means for communication with a closet bowl, and a chamber for the fertile liquid communicating with said bacterial action chamber, and a sterile chamber having a discharge, and receiving fertile liquid from said fertile liquid chamber equal to the inflow to said bacterial action chamber with each flushing of the bowl, and means for sterilizing the liquid during its passage to said sterile chamber.

9. An apparatus for the treatment of sewage comprising a tank divided into a bacterial action chamber having means for communication with a closet bowl and a chamber for the fertile liquid communicating with said bacterial action chamber, and a sterile chamber having a discharge and receiving fertile liquid from said fertile liquid chamber equal to the inflow to said bacterial action chamber with each flushing of the bowl, and means for sterilizing the liquid before it mingles with the main body of the liquid in said sterile chamber.

10. An apparatus for the treatment of sewage, comprising a sterile chamber, a fertile chamber arranged to deliver liquid to said sterile chamber, a discharge for said sterile chamber, means controlled by the rise and fall of the liquid in said sterile chamber for delivering a sterilizing solution to the incoming liquid from said fertile chamber, and means for retarding the mingling of the incoming fertile liquid with the contents of said sterile chamber.

11. An apparatus for the treatment of sewage comprising a tank having a sterile chamber therein provided with a discharge, a fertile chamber communicating with a closet bowl and delivering a quantity of fertile liquid to said sterile chamber equal to the flushing of the bowl, and means for delivering a chemical solution to mingle with the overflow from said fertile chamber to said sterile chamber, and means for retarding the mixture of said overflow with the contents of said sterile chamber.

In witness whereof, I have hereunto set my hand this 28th day of July 1915.

HARRY Y. SCARBOROUGH.

Copies of this patent may be obtained for five cents each, by addressing the "Commissioner of Patents, Washington, D. C."